Jan. 3, 1928.  1,654,952
M. E. VEZIE
COMBINED GAS AND AIR MIXER AND BURNER
Filed Nov. 18, 1926
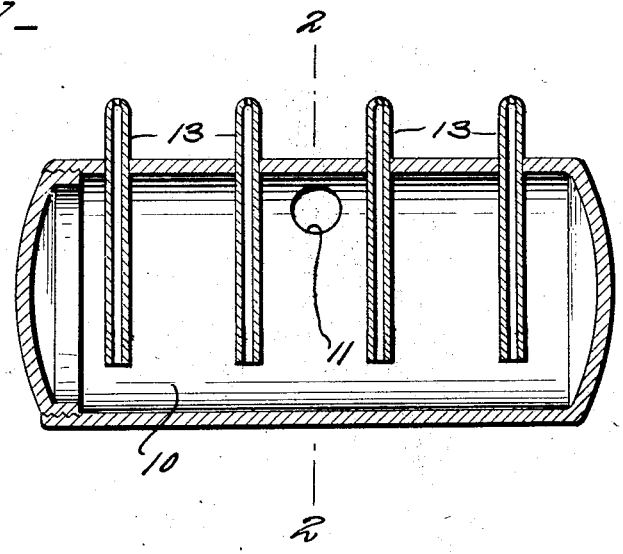
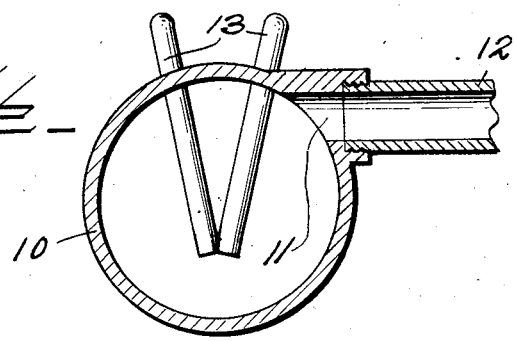
Inventor
M. E. Vezie
By Watson E. Coleman
Attorney Patented Jan. 3, 1928.

1,654,952

UNITED STATES PATENT OFFICE.

MELBOURNE E. VEZIE, OF CUSHING, OKLAHOMA.

COMBINED GAS AND AIR MIXER AND BURNER.

Application filed November 18, 1926. Serial No. 149,161.

This invention relates to low pressure gas and oil burners and particularly to means for mixing the gas or vapor and air and burning the same.

The general object of the present invention is to provide a construction of this kind including a relatively large chamber into which air and gas, preferably previously mixed, are introduced, this chamber being provided with burner tubes extending therefrom opening preferably adjacent the bottom of the chamber whereby the mixed gas and air may be burned.

My invention is illustrated in the accompanying drawings, wherein:—

Figure 1 is a vertical longitudinal section through a gas mixer and burner constructed in accordance with my invention;

Figure 2 is a section on the line 2—2 of Figure 1.

Referring to these drawings 10 designates a chamber of any suitable material which may, for instance, have the form of a barrel and is closed at its opposite ends but provided with an inlet opening 11. This is connected to a source of air and gas preferably under low pressure. Preferably this gas and air will be previously mixed in any suitable air and gas mixer and led by a pipe 12 into the chamber through the opening 11. Extending into the chamber through the top thereof are a plurality of burner pipes 13. These pipes extend below the center of the chamber and have their lower ends disposed relatively adjacent to the bottom of the chamber. Preferably there will be two rows of these pipes 13 extending downward into the chamber in convergent relation. There may be one row of these pipes 13 or more than two rows if desired.

By conducting the gas and air into this relatively large chamber, even if the gas and air have not been previously mixed, I secure in practice a very thorough mixing of the gas and air and thus secure very perfect combustion when the gas and air is lighted at the ends of the pipes 13. This secures a very hot fire. The chamber 10 is adapted to be detached or connected to any air and gas mixture.

It will be noted that the inlet pipe 11 is disposed adjacent the top of the barrel or receiving chamber and this inlet pipe may be disposed either at one end of the chamber or in the middle thereof, as illustrated. The small pipes 13 extend downward quite close to the bottom of the chamber. The gas is mixed thoroughly at the upper part of the chamber before the mixed air and gas sinks downward to the bottom of the chamber and passes through the burner tubes. Gas and air always mixes at the highest point of a container and this mixture of air and gas being relatively heavy, acts to crowd the light air and gas to the bottom of the chamber and thus forces the light air and gases through the burner tubes, securing a very high degree of combustion and a hot fire.

I claim:—

An air and gas mixer comprising a cylindrical chamber closed at its ends and provided at its side with a substantially tangentially disposed inlet opening, said opening being located midway between the ends of the cylinder, burner nipples arranged in pairs and located at the opposite sides of said inlet opening, said nipples passing through the side of the cylinder, the members of each pair of nipples converging toward each other at their inner ends and having their inner ends located below the inlet opening and below the center of the cylinder.

In testimony whereof I hereunto affix my signature.

MELBOURNE E. VEZIE.